United States Patent
Sorge et al.

(10) Patent No.: US 8,549,632 B2
(45) Date of Patent: Oct. 1, 2013

(54) METHOD FOR SUPPORTING ATTACK DETECTION IN A DISTRIBUTED SYSTEM

(75) Inventors: Christoph Sorge, Heidelberg (DE); Jan Seedorf, Heidelberg (DE)

(73) Assignee: NEC Europe Ltd., Heidelberg (DE)

( * ) Notice: Subject to any disclaimer, the term of this patent is extended or adjusted under 35 U.S.C. 154(b) by 169 days.

(21) Appl. No.: 13/062,533

(22) PCT Filed: Aug. 7, 2009

(86) PCT No.: PCT/EP2009/005737
§ 371 (c)(1),
(2), (4) Date: May 19, 2011

(87) PCT Pub. No.: WO2010/025805
PCT Pub. Date: Mar. 11, 2010

(65) Prior Publication Data
US 2011/0239295 A1    Sep. 29, 2011

(30) Foreign Application Priority Data
Sep. 5, 2008 (EP) .................................. 08015629

(51) Int. Cl.
*H04L 29/06* (2006.01)
*G06F 12/14* (2006.01)
*G06F 15/16* (2006.01)

(52) U.S. Cl.
USPC .......................................................... 726/22

(58) Field of Classification Search
None
See application file for complete search history.

(56) References Cited

U.S. PATENT DOCUMENTS

| | | | |
|---|---|---|---|
| 8,135,022 B2 * | 3/2012 | Sterman et al. | 370/401 |
| 2004/0230797 A1 * | 11/2004 | Ofek et al. | 713/168 |
| 2007/0011324 A1 * | 1/2007 | Mehr et al. | 709/225 |
| 2007/0071212 A1 | 3/2007 | Quittek et al. | |
| 2008/0175226 A1 | 7/2008 | Alperovitch et al. | |

FOREIGN PATENT DOCUMENTS

| | | |
|---|---|---|
| DE | 10 2005 029 287 A1 | 12/2006 |
| JP | 2008519532 A | 6/2008 |
| JP | 2008543159 A | 11/2008 |
| WO | 2006/126202 A2 | 11/2006 |

OTHER PUBLICATIONS

International Search Report, dated Dec. 3, 2009, from corresponding PCT application.
Translation of Japanese Office Action, dated Sep. 12, 2012, from corresponding JP application.

* cited by examiner

*Primary Examiner* — Shin-Hon Chen
(74) *Attorney, Agent, or Firm* — Young & Thompson

(57) ABSTRACT

A method for supporting attack detection in a distributed system, wherein a message being sent within the distributed system from a source entity to one or more target entities is transmitted via one or more intermediate entities, and wherein at least one of the one or more intermediate entities—tagging entity—appends an attack information tag to the message indicating whether the message constitutes or is part of an attack, is characterized in that a reputation system is provided, the reputation system being configured to receive the attack information tag generated by the tagging entity, and to generate a rating of the attack information tag.

20 Claims, 1 Drawing Sheet

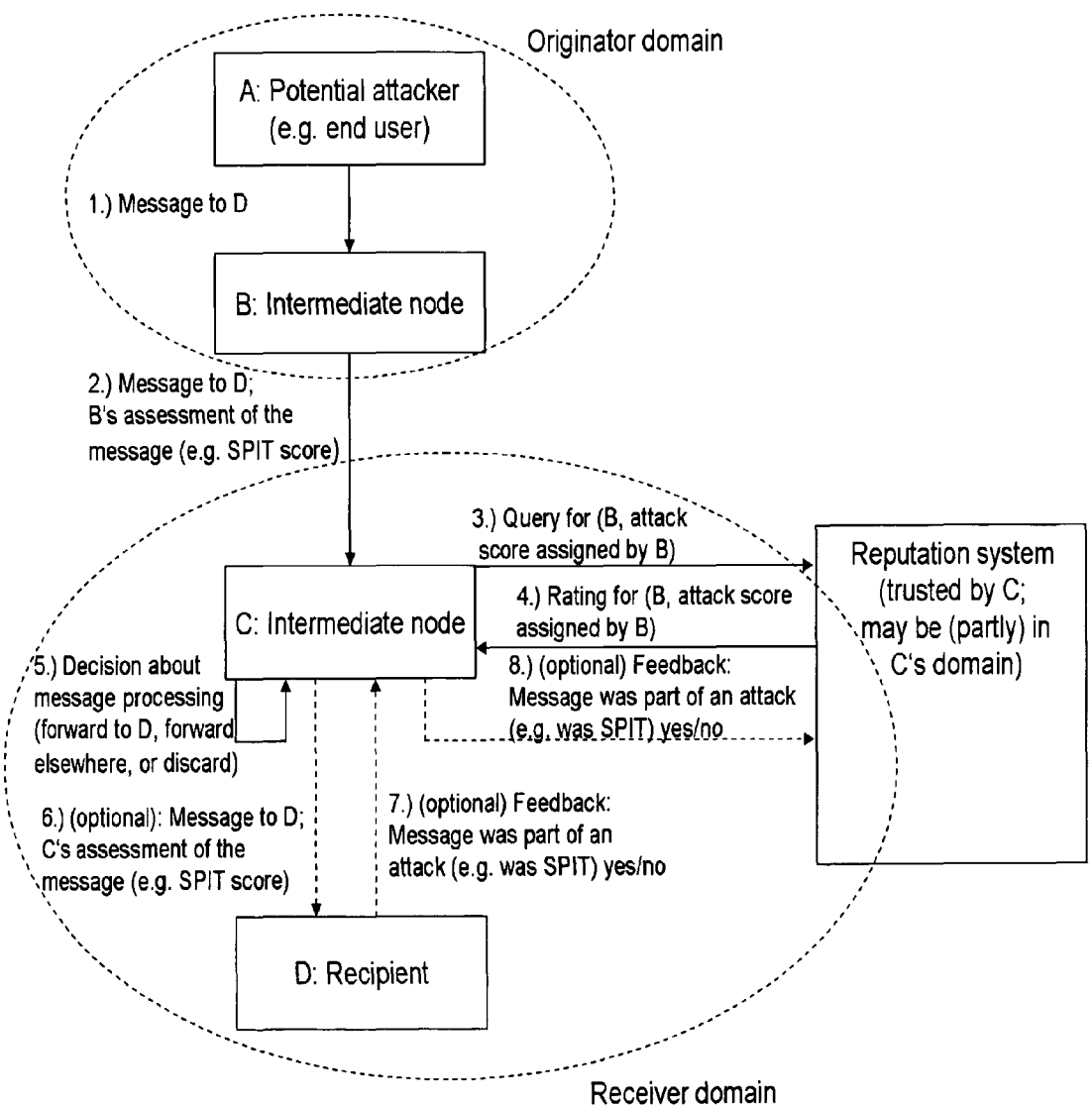

METHOD FOR SUPPORTING ATTACK DETECTION IN A DISTRIBUTED SYSTEM

The present invention relates to a method for supporting attack detection in a distributed system, wherein a message being sent within said distributed system from a source entity to one or more target entities is transmitted via one or more intermediate entities, and wherein at least one of said one or more intermediate entities—tagging entity—appends an attack information tag to said message indicating whether said message constitutes or is part of an attack.

Methods of the above mentioned kind are widely spread nowadays and are applied in various fields, for instance in mobile ad hoc networks with respect to e.g. distributed data collection and collecting attack information. Another specific field of application are modern multimedia systems, which offer users an enormous variety of different services. Multimedia systems are increasingly exposed to various forms of attacks which include, for instance, interruption of service attacks (i.e. Denial of Service, DoS) and social attacks (e.g. SPAM, SPam over Internet Telephony (SPIT), or VoIP Phishing).

For example, in the area of electronic mail unsolicited bulk email messages—so-called SPAM—have become very common and have turned into a severe problem. Not only companies that require email communication are impacted by SPAM messages, but also private users are very annoyed by SPAM. Nowadays many internet users receive more SPAM messages than regular emails. For this reason, almost every server for incoming email uses SPAM filters which check incoming mails according to defined rules. They search, for example, actively for key words in the content of an email, they check specific configurations of the server used for sending the email or they search for senders that are often used for sending bulk emails. In case of a matching classification of an email as SPAM, it is marked and/or sorted out.

In the area of—analog or digital—telephony, SPAM (in this context referred to as SPIT) also occurs more and more often, as it can be seen, for example, in case of unsolicited commercial calls. These calls are mostly made by automated calling machines. Due to the currently and mainly employed switched telephone networks, such SPAM calls are very complicated and expensive which is the reason for a rather restricted number of SPAM calls. When Internet telephony will be used more commonly though, such SPAM calls will become much easier and cheaper, so a tremendous increase of SPAM calls in advanced modern multimedia systems will have to be assumed.

A severe problem is the detection of attacks to multimedia systems or, more specifically, to multimedia sessions between individual users. Today the detection of attacks to multimedia systems is performed mainly by using Intrusion Detection Systems (IDS). These IDS systems are able to monitor the traffic passing by and to take a local decision depending, for example, on the observed traffic structure or traffic content. Apart from such locally acting IDS systems, distributed attack detection schemes are already known in prior art.

A more sophisticated mechanism to deal with the above mentioned types of attacks is to evaluate a likelihood for each message of a multimedia session—e.g. INVITE, CANCEL, BYE, etc. in case of a SIP (Session Initiation Protocol) session—being malicious. To this end different methodologies can be applied at certain intermediate network nodes—e.g. SIP proxy servers, application servers, session border controllers (SBCs), etc.—through which the session messages transit. Such mechanisms propose to append at each contributing network node a score to each evaluated message that indicates the maliciousness of that message. The single scores can then be evaluated together at each hop, for instance by summing them up. Depending on the resulting score, decisions can be made with respect to the further treatment of the messages or the session, respectively. For example, it may be decided to block messages in case the resulting score exceeds a predefined threshold. Alternatively, further inspections may be performed thereby applying advanced call handling and routing. For example, in VoIP applications such further inspections may include caller interaction checks, like a Turing Test (as described in detail in DE 10 2005 029 287 A1), a Voice Printing Test (as described in "Voice Printing and Reachability Code (VPARC) Mechanism for SPIT", WIPRO, white paper), Audio CAPTCHA (Completely Automated Public Turing test to tell Computers and Humans Apart), grey-listing tests, etc.

In numerous contexts, the detection of attacks (e.g. detecting malicious messages in VoIP communications) can be improved by collaboration of several entities, in particular those on the path of an attack. This applies to denial-of-service attacks on the network layer, the initiation of SPIT (Spam over IP telephony) calls on the application layer, and a number of other, similar attack scenarios. When relying on information collected from other entities, this information must be clearly understood by the receiving entity. Further, this information must be evaluated, and its reliability must be assessed. However, it is currently not possible to determine the meaning of such information without a prior agreement. In addition, there is currently no mechanism to decide how reliable information is that has been received from other entities and that is used to decide whether or not a message is part of an attack.

An example of existing technology from the area of VoIP security which makes use of the transmission of attack detection information between entities in a distributed system is the SIP identity as described in RFC 4474 (Peterson, J. & Jennings, C., Enhancements for Authenticated Identity Management in the Session Initiation Protocol (SIP) IETF, 2006). Using this standard, the SIP proxy of a sender of a message signs outgoing messages after authenticating the sender's SIP identity; this signature can be verified by the receiving end's proxy. However, there is currently no method for the receiving proxy to assess the quality of the identity verification procedure of the sending proxy, i.e., how good this proxy prevents identity spoofing and what such a signature actually means with respect to used authentication mechanisms by the sending entity.

A further technology is the above mentioned SPIT scoring (which is described in more detail in Wing, D., Niccolini, S., Stiemerling, M., and H. Tschofenig, "Spam Score for SIP", draft-wing-sipping-spam-score-01 (work in progress), February 2008). To prevent Spam over IP Telephony (SPIT), signaling entities in a distributed VoIP system can—after having applied local and possibly proprietary SPIT detection algorithms—tag a message with a SPIT-score before transmitting the message to the next signaling hop. With current technology, it is generally not possible for other entities receiving a message with such a SPIT score to understand the semantics of such a score or to convey its meaning nor to assess the quality of this score with respect to the message being SPIT or not.

In particular, problems arise when the messages have to transit over peers that do not have a trust relationship with other entities of the distributed system. For instance, in today's distributed e-mail system, there is no such trust relationship and the receiving mail-server does not trust any of the intermediate entities involved in transmitting the e-mail.

However, in VoIP service architectures, there is generally a trust relationship between peering providers (due to billing and other agreements between providers). The present invention particularly concerns such scenarios and tries to exploit these trust relationship in order to better detect attacks in a distributed fashion and increase overall security.

Considering SPIT as an example, such collaboration could be realized by having a SIP service provider tag outgoing calls with information about these calls' SPIT likelihood. For example, if the rate of outgoing calls generated by a customer is very high, there is a high probability that these calls are SPIT. As the recipients of the calls (i.e., the provider of the receiver and the callee) are not aware of the caller's call rate, they have to rely on information added by the outgoing provider (either the call rate itself, or a measure of the overall SPIT probability of a message). In the following this added information will be referred to as "tag".

However, there is no incentive for an entity (in the example: a SIP service provider) to tag correctly (often, this information could be to the own customers' disadvantage). Further, the algorithms used by the sending entity could contain flaws, the entity applying the algorithms could be compromised, or the algorithms could be applied in a wrong/suboptimal way (due to configuration errors). Thus, for the entity relying on the tag, it is very difficult to assess its reliability.

Even more importantly, even if the tag is provided in a correct fashion, the relying entity does not know its meaning, except if a prior agreement has been made concerning the tag's semantics. Generally, in a distributed system it can be assumed that there will be multiple local (potentially proprietary) algorithms executed at each participant/provider, so that it is infeasible to communicate all the semantics of these algorithms among participants/providers. Thus, the fundamental problem arises for an entity receiving a "tag" to determine the meaning of such a tag. In addition, the problem of assessing the quality of such a tag (with respect to attack detection) arises at the receiving entity.

It is therefore an object of the present invention to improve and further develop a method of the initially described type in such a way that, by employing mechanisms that are readily to implement, an enhancement in terms of attack detection quality and significance of attack information as well as antagonizing confidentiality problems is achieved.

In accordance with the invention, the aforementioned object is accomplished by a method comprising the features of claim 1. According to this claim such a method is characterized in that a reputation system is provided, said reputation system being configured to receive said attack information tag generated by said tagging entity, and to generate a rating of said attack information tag.

According to the invention it has first been recognized that in the context of supporting attack detection in a distributed system the attack detection quality and significance of attack information can be improved by using a reputation system. Further, it has been recognized that attack detection optimizations and assessments can be achieved by applying reputation systems in a new way, in fact by not just rating other entities, but taking their capabilities into account. More specifically, according to the invention the reputation system is configured to receive the (potentially proprietary) attack information tag generated by the tagging entity. Thereupon the reputation system generates a rating of the—potentially proprietary—attack information tag. Thus, the reputation system provides an assessment concerning the attack information tag of a tagging entity and thereby implies a significant enhancement of attack detection quality. As a result, the reliability and quality of attack detection (e.g., SPIT detection) at the receiving end, i.e. the target entity, is improved.

As what regards the kind of message being under consideration, the present invention does not imply any restrictions. The message may be for example, but not limited to, an IP packet, a TCP flow or a SIP message.

In a preferred embodiment at least one of the intermediate entities located between the tagging entity and the one or more target entities functions as evaluating entity that evaluates the tagged message by querying the reputation system for the rating of the attack information tag. In case more than two intermediate entities are involved in the transport of the message, thereby composing a transport chain, each entity in this transport chain may participate in the reputation system. This means, each intermediate entity may query the reputation system and may generate its own attack information tag for the respective message taking into consideration the rating received from the reputation system in response to its query.

Particularly, it may be provided that the last of the intermediate entities next to the recipient of the message—i.e. the last intermediate node forwarding the message to the recipient—functions as evaluating entity that evaluates the tagged message by querying the reputation system for the rating of the attack information tag.

With respect to high flexibility it may be provided that the evaluation of the tagged message can either relate to evaluating a (single) attack information tag or to evaluating a combination of attack information tags appended to the message by previous intermediate entities. The selection of which attack information tags of a message are evaluated may depend on the preferences and/or capabilities of the evaluating entity.

Taking the above into consideration, the reputation system may be used to assess the detection quality of one or more tagging entities. For this purpose the reputation system may generate the rating on the basis of previous experiences with the tagging entity.

Furthermore, the reputation system may provide a rating which considers the reliability and trustworthiness of the attack information tag. In this regard the reputation system is applied on a service provider level instead of assessing trustworthiness on the level of communication end points or end users.

According to a preferred embodiment, a tuple solely comprising the tagging entity or an identification thereof may be considered as the subject to be rated by the reputation system. This embodiment may also be employed in case that none of the intermediate entities has appended an attack information tag to the message.

In certain cases an additional consideration of the specific algorithm employed by a tagging entity for assessing and tagging a message may prove to be advantageous with respect to a higher accuracy and reliability. In this connection it is important to note that a tagging entity may employ different algorithms for tagging different messages or that a tagging entity may employ more than one algorithm for tagging one specific message. In these cases each algorithm may be rated separately. Therefore, a tuple comprising the tagging entity (or an identification thereof) and the algorithm employed by the tagging entity for assessing and tagging the message (or an identification thereof) may be considered as the subject to be rated by the reputation system. Thus, it is possible for the evaluating entity to assess the quality of security algorithms applied at different points in a network. In addition, it is possible to detect changes in the quality of these algorithms over time.

In particular with respect to a tagging entity that always employs one and the same algorithm, it may be provided that a tuple comprising the tagging entity or an identification thereof and the rating generated by the tagging entity may be considered as the subject to be rated by the reputation system.

According to a particularly preferred embodiment that yields very high accuracy, it may be provided that a tuple comprising the tagging entity or an identification thereof, the algorithm employed by the tagging entity for assessing and tagging the message—or an identification thereof—and the rating generated by the tagging entity are considered as the subject to be rated by the reputation system.

In an advantageous manner the reputation system may perform a mapping of the attack information tag appended to the message by the tagging entity to an information the definition of which is agreed upon between the reputation system and the evaluating entity. By this means the evaluating entity is enabled to determine an appraisal of the attack information tag, even without having to know the algorithm used by the tagging entity and without needing other information about processes internal to the tagging entity. This means that the attack information tag does not have to be understandable by the evaluating entity. In other words, the method enables a mapping of local meanings of tags (e.g. security scores) to a global meaning and view regarding the participants of the system.

The information which is provided by the reputation system may be given in form of a probability indicating that the message or a communication related to the message constitutes or is part of an attack. Insofar, the reputation system assesses how reliable an entity tags outgoing messages with respect to the likelihood that these messages constitute or are part of an attack. The probability may be evaluated on the basis of the attack information tag provided by the tagging entity—e.g. an intermediate router or a SIP service provider—and/or the past experience with the tagging entity and/or the reputation of the tagging entity. This assumes that the tagging entity is not a potential attacker. However, in practice this assumption will be generally fulfilled since the tagging entity will typically be the service provider of the source entity, e.g. a SIP caller, whereas the evaluating will typically be the service provider of the target entity, e.g. a SIP callee.

In order to evaluate the detection ability of a tagging entity, for example a SIP service provider from which a message is received, some mechanism is required to determine whether or not the message is malicious or whether an incoming call is SPIT, respectively. Therefore, a heuristic mechanism may be used to train the reputation system, for example heuristics based on the length of calls. Alternatively, it may be provided that the evaluating entity, which may also be a SIP service provider, uses such a mechanism.

According to a further embodiment, a feedback mechanism may be used to train the reputation system, preferably on the basis of empirical values and/or experienced data. The feedback to the reputation system may be optional, meaning that feedback is not required for each single message. However, the reputation system needs to get feedback at least for some messages. An example for such a feedback mechanism is given in an IETF draft describing SPIT user feedback (S. Niccolini, S. Tartarelli, M. Stiemerling, S. Srivastava: "SIP Extensions for SPIT identification", draft-niccolini-sipping-feedback-spit-03 (work in progress), February 2008, http://tools.ietf.org/html/draft-niccolini-sipping-feedback-spit-03) the entire content of which is incorporated herein by way of reference. The feedback mechanism enables the reputation system to receive information on the actual handling of the messages by the target entities.

Advantageously, in case none of the one or more intermediate entities appends an attack information tag to the message, the probability that the message constitutes or is part of an attack may be assessed by the reputation system, preferably on the basis of empirical values and/or experienced data.

The reputation system itself may be centralized or distributed. In either case, although a trust relationship has to be established between the evaluating entities and the reputation system, the reputation system does not have to be under control of the evaluating entity but, however, it may be advantageous to have an instance of a distributed reputation system running in the evaluating entities' domain. The reputation system may be used similarly as they are used in other contexts like Peer-to-Peer file sharing or eBay transactions. Typically, reputation systems involve communication about the reputation of a specific entity, i.e., the aim is to make information available to all system participants that allows them to judge whether or not an entity behaves maliciously. For example, in file sharing networks, if node A receives a file containing a virus from node B, it will give feedback to the reputation system that node B has behaved maliciously. Thus, in case of a centralized system a system similar to the eBay system may be employed as reputation system. On the other hand, in case of distributed approach the Eigentrust system may be employed. The Eigentrust system is described in detail in "Kamvar, S. D.; Schlosser, M. T.; Garcia-Molina, H.: The Eigentrust algorithm for reputation management in P2P networks. In WWW '03: Proceedings of the 12th international conference on World Wide Web, ACM, 2003, pages 640-651. Online: http://www.stanford.edu/~sdkamvar/papers/eigentrust.pdf", the entire content of which is incorporated herein by way of reference.

According to a further embodiment it is noted that the method for supporting attack detection in a distributed system is used in a SIP/VoIP context.

There are several ways how to design and further develop the teaching of the present invention in an advantageous way. To this end, it is to be referred to the patent claims subordinate to patent claim 1 on the one hand, and to the following explanation of a preferred example of an embodiment of the invention illustrated by the drawing on the other hand. In connection with the explanation of the preferred example of an embodiment of the invention by the aid of the drawing, generally preferred embodiments and further developments of the teaching will be explained. In the drawing the only FIGURE is a schematic overview illustrating an example of an application scenario of a method according to the present invention.

The only FIGURE shows an example application scenario in the context of digital telephony and SPIT detection. In the illustrated embodiment a potential attacker A, for example an end user, which resides together with intermediate node B in the—so-called—originator domain, sends a message to recipient D via intermediate nodes B and C. Intermediate node C resides together with recipient D in the—so-called—receiver domain. Intermediate node C functions as evaluating entity. The reputation system is trusted by intermediate node C and may be (partly) in the domain of intermediate node C. The only FIGURE illustrates a possible scenario for using a reputation system which provides a mapping and assessment of local attack scores across intermediate nodes which may be e.g. service providers. It is to be noted the method according to the invention does not rely on a specific kind of reputation system. Both central reputation systems and distributed reputation systems are possible.

In the following the single steps of the exemplary embodiment illustrated in the FIGURE are described in some more detail. A potential attacker A sends a message to recipient D, wherein in a first step (1) the message is sent via intermediate node B, which is located in the originator domain. Intermediate node B analyzes the message according to its capabilities and appends a (potentially proprietary) attack information tag to the message, i.e. node B functions as tagging entity. The appended tag constitutes node B's assessment of the message, for example in the form of a SPIT score. This assessment of intermediate node B indicates whether the message received from potential attacker A constitutes or is part of an attack. In a next step (2), intermediate node B forwards the tagged message—i.e. the message together with B's assessment of the message—to intermediate node C.

Intermediate node C receives the message and operates as evaluating entity that evaluates the tagged message by querying the reputation system indicated in step (3), more specifically, for a rating concerning the tuple comprising the tagging entity B and the rating—i.e. the attack score—generated by the tagging entity B. The reputation system handles that query of intermediate node C by generating its own rating of said tuple—for example but not limited to on the basis of previous experiences with tagging B entity—and transmits the rating in step (4) to intermediate node C. Subsequently, the evaluating entity C decides in step (5) about further processing of the message originated by the potential attacker A on the basis of the rating generated by the reputation system. Options for the further message processing are, for example, to forward the message to recipient D, forward the message elsewhere or discard the message.

Finally, in the optional step (6) the evaluating entity C forwards the message plus C's assessment of the message—e.g. a SPIT score—which bases on the rating of the reputation system to recipient D.

As already mentioned above, in regard to the reputation system the method according to the invention does not rely on a specific kind of reputation system. One can use both centralized and distributed reputation systems. In order to evaluate the detection ability of intermediate node B, which might be a SIP service provider, some mechanism is required by the reputation system to generate a rating of B's assessment of the transmitted message originated by the potential attacker A. The exemplary embodiment illustrated in the FIGURE features for this purpose a mechanism using explicit user feedback. Therefore the optional steps (7) and (8) are designated. In the optional step (7) the recipient D transmits its feedback the evaluating entity C indicating that the received message was part of an attack or not, for example that the received message was SPIT. Subsequently, the evaluating entity forwards this user feedback to the reputation system, wherein this user feedback—in reference to the query of step (3)—serves the purpose of training the reputation system. In this connection, it is also possible for the reputation system to be queried by entities which do not provide any feedback back to it. The feedback mechanism implied in the FIGURE is only optional in the sense that it is not required for each single message. However, feedback is needed at least for some of these messages. The more recipients provide a feedback to the reputation system, the more accurate and reliable will be the rating given by the reputation system.

It is noted that the functioning of the reputation system is already ensured if only one or a few intermediate nodes—e.g. service providers—participate. An intermediate node from which an attack originates need not use the reputation system. It is further noted that it is possible for the reputation system to be queried by entities not providing feedback to it.

In the following a specific embodiment of the present invention employing the reputation framework for SIP service providers (which use SIP proxies) is described in some more detail:

It is assumed that a SIP proxy acting as outgoing proxy adds an assessment regarding the attack (or SPIT) probability to each outgoing INVITE message, for example on a scale from one to five (one indicating a small and five indicating a very high attack probability). However, the range of this assessment function used by outgoing proxies is irrelevant to the reputation framework.

An arbitrary existing distributed reputation system is then used. As entities to be assessed, tuples of SIP service providers and assigned scores are used, e.g. ("Domain X", "Score Y"). Entities participating in the reputation system exchange information to assess the probability that messages coming from a certain provider and being tagged with a certain score are malicious or not. In other words: It is not the reputation of a SIP service provider X that is dealt with, but the reputation of the class of messages that has been tagged with value "Y" by SIP service provider X (Y being a number between 1 and 5 in the present example). This enables an evaluating entity that consults the reputation system to consider the quality of SPIT detection algorithms used by X without having to know which algorithms are used at all.

As an extension, if a SIP service provider attaches tags generated by different algorithms, the entities to be assessed are tuples like ("Domain X", "Algorithm a", "Score y"). With this embodiment, both a provider and its attack detection abilities are assessed. An evaluating entity that consults the reputation system is enabled to identify the semantics of the scores assigned, even if the algorithms used are proprietary and secret. If a SIP service provider does not add any score to the message, only the provider's identity will be used as input to the reputation system (e.g., "Domain X", " ").

In order to evaluate the detection ability of a SIP service provider from which a message is received, some mechanism is required to determine whether or not an incoming call is SPIT. This is possible using explicit user feedback; alternatively, the evaluating SIP service provider can use other mechanisms (e.g., heuristics based on the length of calls). As shown in the FIGURE, feedback to the reputation system is optional, meaning that feedback is not required for each single call; however, the reputation system needs to get feedback at least for some calls. The feedback mechanism is a precondition for the system to work.

If more than two providers with their proxy servers are involved in forwarding an INVITE message, then each of them can add its own tag to the message. They have the choice whether to (1) use the reputation system sequentially with their predecessors' tags or to (2) just consider the tag added by the end user's outgoing proxy.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. Method for supporting attack detection in a distributed system, wherein a message being sent within said distributed system from a source entity to one or more target entities is transmitted via one or more intermediate entities, and wherein at least one of said one or more intermediate entities—tagging entity—appends an attack information tag to said message indicating whether said message constitutes or is part of an attack, characterized in that a reputation system is provided, said reputation system being configured to receive said attack information tag generated by said tagging entity, and to generate a rating of said attack information tag, wherein at least one of said intermediate entities located between said tagging entity and said one or more target entities functions as evaluating entity that evaluates said tagged message by querying said reputation system for said rating of said attack information tag.

2. Method according to claim 1, wherein the last of said intermediate entities next to said target entity functions as evaluating entity that evaluates said tagged message.

3. Method according to claim 1, wherein the evaluation of said tagged message relates to evaluating an attack information tag or a combination of attack information tags appended to said message by preceding intermediate entities.

4. Method according to claim 1, wherein said reputation system generates said rating on the basis of previous experiences with said tagging entity.

5. Method according to claim 1, wherein said rating considers reliability and trustworthiness of said attack information tag.

6. Method according to claim 1, wherein a tuple comprising only said tagging entity or an identification thereof is considered as the subject to be rated by said reputation system.

7. Method according to claim 1, wherein a tuple comprising said tagging entity and the algorithm employed by said tagging entity for assessing and tagging said message is considered as the subject to be rated by said reputation system.

8. Method according to claim 1, wherein a tuple comprising said tagging entity and said rating generated by said tagging entity is considered as the subject to be rated by said reputation system.

9. Method according to claim 1, wherein a tuple comprising said tagging entity, the algorithm employed by said tagging entity for assessing and tagging said message and said rating generated by said tagging entity is considered as the subject to be rated by said reputation system.

10. Method according to claim 1, wherein said reputation system performs a mapping of said attack information tag appended to said message by said tagging entity to an information of which the definition is agreed upon between said reputation system and said evaluating entity.

11. Method according to claim 10, wherein said information indicates a probability that said message constitutes or is part of an attack.

12. Method according to claim 11, wherein said probability is evaluated on the basis of at least one of said attack information tag provided by said tagging entity, the past experience with said tagging entity, and the reputation of said tagging entity.

13. Method according to claim 11, wherein, in case none of said one or more intermediate entities appends an attack information tag to said message, said probability that said message constitutes or is part of an attack is assessed by said reputation system on the basis of at least one of empirical values and experienced data.

14. Method according to claim 1, wherein a heuristic mechanism is used to train the reputation system.

15. Method according to claim 1, wherein a feedback mechanism is used to train the reputation system on the basis of at least one of empirical values and experienced data.

16. Method according to claim 15, wherein said feedback mechanism enables said reputation system to receive information on the actual handling of said messages by said target entities.

17. Method according to claim 1, wherein said reputation system is a centralized system.

18. Method according to claim 1, wherein said reputation system is a distributed system.

19. Method according to claim 1, wherein a trust relationship is established between said evaluating entities and said reputation system.

20. Method according to claim 1, wherein said reputation system generates said rating by analyzing and assessing a quality of said attack information tag.

* * * * *

UNITED STATES PATENT AND TRADEMARK OFFICE
CERTIFICATE OF CORRECTION

PATENT NO.       : 8,549,632 B2                                                          Page 1 of 1
APPLICATION NO. : 13/062533
DATED            : October 1, 2013
INVENTOR(S)      : Sorge et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 242 days.

Signed and Sealed this

Fifteenth Day of September, 2015

Michelle K. Lee
*Director of the United States Patent and Trademark Office*